United States Patent [19]
Piccotti

[11] 3,775,125
[45] Nov. 27, 1973

[54] SELENIUM COMPOUNDS
[75] Inventor: Enzo Piccotti, Gubbio, Italy
[73] Assignee: Ilford Limited, Ilford, England
[22] Filed: Sept. 28, 1971
[21] Appl. No.: 184,623

[30] Foreign Application Priority Data
Oct. 1, 1970 Great Britain.................. 46,800/70

[52] U.S. Cl. .............................. 96/60 BF, 96/53 X
[51] Int. Cl............................ G03c 5/32, G03c 7/00
[58] Field of Search..................... 96/60 BF, 60, 61, 96/22, 62, 53

[56] References Cited
UNITED STATES PATENTS
3,619,188  11/1971  Alcock et al. .......................... 96/60
3,701,662  10/1972  Piccotti............................. 96/60 BF FOREIGN PATENTS OR APPLICATIONS
2,063,576  7/1971  Germany .............................. 96/60

Primary Examiner—Norman G. Torchin
Assistant Examiner—M. F. Kelley
Attorney—E. F. Wenderoth et al.

[57] ABSTRACT

This invention relates to new selenium compounds: Bis (1,2,4-triazol-3yl) diselenides, unsubstituted or substituted by alkyl, aralkyl or hydroxy groups. The diselenides are useful as bleach-fix accelerators in the processing of colour photographic material.

10 Claims, No Drawings

SELENIUM COMPOUNDS

According to the present invention there is provided a bis-(1,2,4-triazol-3yl) diselenide of the formula Ia        A — Se — Se — A wherein each A represents a 1,2,4-triazolyl radical bound in its 3-position to the diselenide chain and bound in its 5-position to a hydrogen atom, an alkyl group, an aralkyl group or a hydroxy group, and one nitrogen atom only of each A radical being bound to a hydrogen atom or to an alkyl group.

The bis-(1,2,4-triazole-3yl) diselenides of this invention may also be represented by the formula Ib
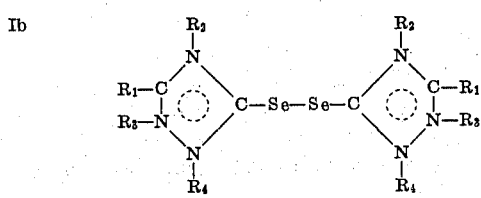

wherein $R_1$ is a hydrogen atom or an alkyl, aralkyl, or hydroxy group, and one only of $R_2$, $R_3$ or $R_4$ is a hydrogen atom or an alkyl group, the nitrogen atoms not substituted forming part of the double bond system of the aromatic ring.

Alternatively these bis-(1,3,4-triazole-3yl) diselenides may be represented by the formula Ic
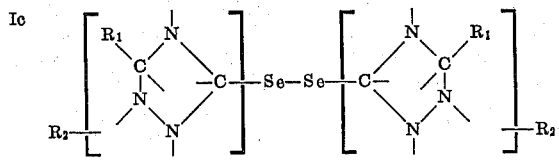

wherein $R_1$ and $R_2$ have the same meaning as in formula Ib and the valence bounds not saturated by $R_1$, $R_2$ and Se indicate the double bonds in the 1,2,4-triazole rings.

In the following mainly formulae of the type Ic will be used.

The bis (1,2,4-triazolyl) diselenides of the formula

II
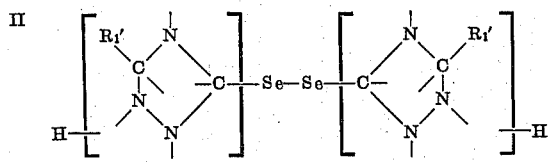

wherein $R_1'$ stands for a hydrogen atom, a methyl group or a hydroxy group.

The bis (1,2,4-triazol-3yl) diselenides of the formulae Ia, Ib, Ic can be obtained by reacting a compound of the formula IV
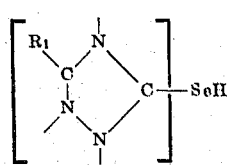

wherein $R_1$ and $R_2$ have the meaning given with an oxidizing agent in solution, preferably in the presence of a base, removing the solvent and separating the reaction product.

Preferably the reaction is carried in ethanol and the oxidising agent used in the above process is hydrogen peroxide, or the reaction is carried out in an aqueous medium using iodine in potassium iodide as the oxidizing agent.

Compounds of the formula IV can be prepared in accordance with U.S. Pat. application Ser. No. 100,841 as follows:

a. Reacting a selenosemicarbizide of the formula

V
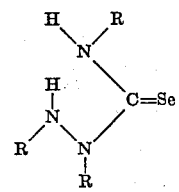

wherein two R's represent hydrogen atoms and one R also represents a hydrogen atom or represents an alkyl group with an acid chloride of the formula $R_1''$—CO—Cl in the presence of a base or with an acid anhydride of the formula $(R_1''$—CO$)_2$O where $R_1''$ is an alkyl group or an aralkyl group to form the acyl derivative of the selenosemicarbazide, and then ring closing this acyl derivative by heating it in the presence of an alkali metal salt of a weak acid, for example an acetate or carbonate, or in the presence of an alkali metal hydroxide or an alkoxide.

b. Reacting a selenosemicarbazide of the formula V with formic acid and then closing the ring as indicated under (a) leads to compounds of formula IV wherein $R_1$ is hydrogen.

c. Compounds of the formula IV wherein $R_1$ is a hydroxyl group are obtained by reacting a selenosemicarbazide of the formula V with an alkyl haloformate in the presence of a base to form the alkoxy carbonyl derivative of the selenosemicarbazide and ring closing this compound in the presence of an alkali metal salt of a weak acid with the elimination of the appropriate alkanol.

The compounds of formula Ia, Ib, Ic are of use in the processing of photographic material comprising silver halide emulsion layers and adapted for processing to yield colour images, (hereinafter referred to simply as "colour photographic material").

In the processing of conventional colour photographic material a developable silver salt image is developed with an aromatic primary amino developing agent of the para-phenylene diamine type (a so-called "colour developer") in the presence of a compound (a so-called "colour coupler") which will combine with the oxidation products of the colour developer to form an azomethine or quinone-imine dye. The dye is thus formed in situ with the developed silver image. Subsequently the product must be treated with a bleach bath and a fixing bath or a combined bleach-fix bath thereby to remove silver and any residual silver halide or other silver salt, leaving in the product only the dye image.

In the silver-dye-bleach process of colour photography the photographic material comprises at least one silver halide emulsion layer which includes as a dispersion therein an organic dyestuff of the type which can be destroyed (or bleached) by finely divided silver in a suitable treatment bath. The organic dyestuff is usually an azo dye. Most commonly three such silver halide emulsion layers are prsent each of which is sensitive to a different region of the visible spectrum and each of which contains a different azo dye. The usual processing sequence for the production of a dye image in the material is after an imagewise exposure to develop the material in a black and white developer. The development is then stopped and the unexposed silver halide is fixed out. Then after washing the material is treated in a dye-bleach bath which oxidises the silver image and simultaneously reduces (bleaches) the dye in the region of the silver image. The silver salts and any residual silver must then be removed. This is usually accomplished by washing the material after its treatment in the dye-bleach bath and then treating it in a bleach bath followed by a fixing bath or treating it in a combined bleach-fix bath. The photographic material then contains a dye image only; this dye image being usually a direct positive reproduction of the original.

In one commercially available silver-dye-bleach material the amount of residual silver left after the dye-bleach step is not negligible because this material requires to be processed so that the dye-bleach step is terminated before all the image silver has been used in reducing the dye. Thus in the processing of this silver-dye-bleach material in particular it is essential that an effective silver bleach step succeeds the dye-bleach step in order to ensure that the residual silver is removed as completely as possible from the material.

In both the processing of conventional colour photographic material and in the processing of silver-dye-bleach material the use of a combined bleach-fix bath is preferable because it results in a reduction of the processing time and of the cost of processing equipment required. Normally a bleach-fix bath comprises a mild oxidising agent for example a ferric chelate complex, a cupric complex or a cobalt (III) complex together with a silver halide solvent or fixing agent for example a water-soluble thiosulphate or a water-soluble thiocyanate. Strong oxidising agents cannot be used because they tend to oxidise the silver halide solvent.

Stable bleach-fix solutions comprising ferric chelate complexes and sodium thiosulphate may be obtained but because of the weak oxidising power of the ferric chelate complex such bleach-fix baths can only be used commercially for the processing of photographic materials with a fairly low silver content.

Therefore according to this aspect of the present invention in the processing of colour photographic material comprising silver halide emulsion layers to yield material having colour dye images therein there is provided a bleach-fix step which comprises treating the photographic material with a stable bleach-fix bath which comprises an aqueous solution of a mild oxidising agent and a silver halide solvent which is either a water-soluble thiosulphate or a water-soluble thiocyanate in the presence of a bleach-fix accelerator which is a water-soluble compound of formula I.

By "stable bleach-fix bath which comprises an aqueous solution of a mild oxidising agent and a silver halide solvent" is meant a bleach-fix bath wherein the oxidising agent is strong enough to bleach the silver but is not strong enough to oxidise the silver halide solvent, i.e., the thiocyanate or the thiosulphate, to an appreciable degree.

The preferred mild oxidising agents for use in the present invention are ferric chelate complexes or diaquo-tetrammino-cobalt (III) complexes.

By ferric chelate complex is meant a co-ordination compound of the ferric ion and a compound which comprises nitrogen and/or oxygen-containing co-ordinating groups. The most important co-ordinating groups are amino, heterocyclic nitrogen, carboxyl and carbonyl groups.

The preferred ferric chelate complex for use in the bleach-fix step of the present invention is a ferric ethylene-diamine-tetraacetic acid complex. It is to be understood that this compound may be used as such in the preparation of a bleach-fix bath or it may be formed in situ in a bleach-fix bath by ethylenediaminetetraacetic acid reacting with a ferric salt e.g., ferric chloride. In Example 2 which follows the ferric ethylene-diaminetetraacetic acid complex has been formed in situ.

Other ferric chelate complexes which may be used in the present invention are for example pyridine-2:6-dicarboxylate-ferrate (III) complex, iminediacetatoferrate (III) complex and nitrilo-triacetateferrate (III) complex.

The bleach-fix accelerators of use in the present invention are preferably added to the bleach-fix bath but they may be present during the bleach-fixing treatment adsorbed in the colour photographic material. Thus the bleach-fix accelerators of use in the present invention may be present in any treatment bath or wash bath which is used in the colour development process between the development step and the bleach-fix step. Exemplary of such baths are stop baths and stop-fix baths.

The bleach-fix accelerators cannot be present, however, in the developing solution as they interfere with the development of the colour material. For the same reason the bleach-fix accelerators of the present invention can not be present initially in the photographic material.

According to another embodiment of the present invention there is provided a stable bleach-fix bath which comprises an aqueous solution of a mild oxidising agent, as hereinbefore defined, a water-soluble thiosulphate and a bleach-fix accelerator which is a compound of the above formula I.

Preferably in this aspect of the invention the mild oxidising agent is a ferric chelate complex or a diaquo-tetrammine-cobalt (III) complex.

It is preferred that the concentration of the compound of formula I present in the bleach-fix bath is greater than 1 mg per litre of bleach-fix bath. The most preferred amount being 150 mg of bleach-fix accelerator per litre of bleach-fix bath.

It is preferred that the concentration of the compound of formula I present in a stop-fix bath, stop bath or in a wash bath, is greater than 1 mg per litre of the solution.

Selenols to be used for the preparation of the diselenides can be prepared in accordance with the following prescriptions A, B and C.

A. 5-Methyl 1,2,4-triazole-3-selenol a. Preparation of 1-acetylselenosemicarbazide A slurry of selenosemicarbazide (3.7 g) in dry distilled pyridine (15 ml.) was cooled in ice-water and acetic anhydride (2.8 g) was added dropwise over 5 minutes with stirring. After 30 mins, the mixture was removed from the ice-bath, left at room temperature overnight, then diluted with water (50ml) and evaporated to dryness in vacuo. A little ethanol was added, and the oily liquid was scratched to promote crystallisation. The acetyl compound was filtered off and washed with a little ethanol, giving grey-white prisms, m.p. 157°–158° (decomp.) Yield: 3.2 g (66.5 percent), b. Preparation of 5-methyl-1,2,4-triazole-3-selenol from the acetyl compound prepared above.

Sodium (1.0 g) was dissolved in ethanol (100 ml), and to this solution was added 1-acetylselenosemicarbazide (3.2 g) in portions. The mixture was heated under reflux for 1½ hours. It was then cooled, diluted with water (100 ml) when a red precipitate of selenium appeared. The mixture was filtered, and then made acid to pH 5 with dilute hydrochloric acid. The mixture was boiled to coagulate the selenium, filtered thoroughly, and then evaporated to dryness. A little water was added, then the selenol was filtered off. The filtrate was evaporated to dryness, a little water added, and more of the selenol was filtered off. When recrystallised from water the crude selenol formed yellow needles, m.p. about 150° (darkens) and at 218°–222° a clear yellow liquid is obtained. Yield 1.5 g (50.9 percent).

B. 1,2,4-Triazole-3-selenol a. 1-Formylselenosemicarbazide

A mixture of selenosemicarbazide (2.7 g) and formic acid (5 ml) was heated under reflux for ½ hour. The solution was cooled, and diluted with water (20 ml), and the precipitate as filtered off, washed with a little ice-water and dried. Crystallization of the solid from water gave pink platelets of the 1-Formyl derivative, m.p. 167°–169° (decomp.). Yield 1.9 g.

b. 1,2,4-Triazole-3-selenol

Cyclization of the formyl derivative (1.0 g) was accomplished by treating it with 10 percent sodium hydroxide solution (3.6 ml) acidification to $p_H$ 6, filtration and crystallization. This gave 1,2,4-triazole-3-selenol (0.4 g), m.p. 150° (darkens), 220°–223° (yellow liquid).

C. 5-Hydroxy-1,2,4-triazole-3-selenol a. 1-Ethoxycarbonylselenosemicarbazide

Ethyl chloroformate (4.3 g) was added dropwise to a cold slurry of selenosemicarbazide (5.5 g) in dry pyridine (20 ml) After stirring at room temperature overnight, the solution was diluted with water, evaporated in vacuo, triturated with water and filtered giving a solid which crystallized from water as greyish prisms of the 1-ethoxycarbonyl derivative, m.p. 194.5°–195.5° (decomp.). Yield 3.7 g.

b. 5-hydroxy-1,2,4-triazole-3-selenol

The ethoxy-carbonyl derivative (2.1 g) was treated with 10 percent sodium hydroxide solution (6 ml) in the manner described above. Crystallisation of the pink precipitated solid from ethanol gave a bright red solid which slowly became yellow in colour. The yellow solid was purified by dissolving it in 10 percent sodium hydroxide solution and reprecipitating it with concentrated hydrochloric acid. The recrystallized yellow solid has m.p. 293°–295° (decomp.) Yield 1.0 g. The nuclear magnetic resonance spectrum of the triazole in deuterium oxide showed no signal which could be attributed to the presence of an ethoxy group in the molecule. A carbonyl peak at 1700 cm$^{-1}$ (broad) in the infrared spectrum confirmed the presence of the enolic hydroxyl group in the 5-position of the 1,2,4-triazole-3-selenol.

The following examples will serve to illustrate the invention.

EXAMPLE 1

Preparation of bis (5-methyl-1,2,4-triazol-3-yl) diselenide.

1 g of 5-methyl-1,2,4-triazole-3-selenol was dissolved in 100 ml of ethanol containing 2 ml of conc. ammonia. 0.5 ml of $H_2O_2$ (30 percent solution) were added drop by drop with stirring to the above solution at room temperature. The solvent was then removed under reduced pressure while keeping the reaction vessel in a water bath at 40°C. The yellow residue was recrystallised from 45 ml of water. Yield 0.792 gr. The yellow compound obtained, m.p. 204°C, showed an I.R. spectrum almost identical to that of a well characterised sample of bis (5-methyl-1,2,4-triazol-3-yl) disulphide. Its U.V. spectrum (in water) indicated absence of unreacted 5-methyl-1,2,4-triazol-3-selenol.

The above prepared compound was used in Example 2.

EXAMPLE 2

Samples from a batch of a colour negative tripack material of the colour coupler substantive type containing 72.6 mg of silver per dm$^2$ as silver iodobromide emulsion were fogged and processed at 24°C.

Details of the colour film used are as follows:

| Layer Order and Sensitivity | Silver Coating Weight in mg of Ag/decimetre$^2$ |
|---|---|
| Non Stress | — |
| Blue Sensitive | 13.4 |
| Colloidal Silver | — |
| Filler Layer | — |
| Green Sensitive Topcoat | 13.1 |
| Interlayer | — |
| Green Sensitive Subcoat | 16.0 |
| Interlayer | — |
| Red Sensitive Topcoat | 17.5 |
| Red Sensitive Subcoat | 13.6 |
| Base of cellulose triacetate | — |
| TOTAL | 73,6 |

In this film:

the blue sensitive layer contained a yellow colour coupler of the formula:

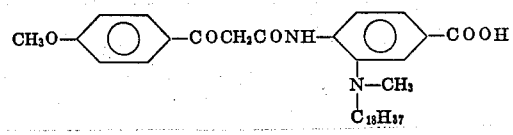

the green sensitive layers each contained a magenta colour coupler of the formula:

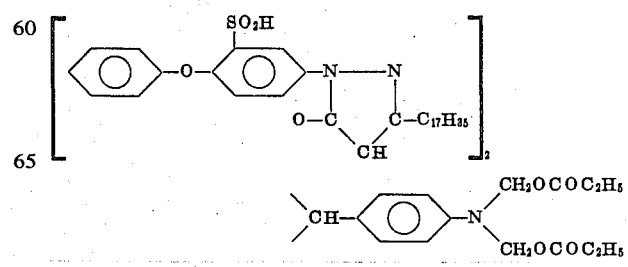

the red sensitive layers each contained a cyan colour coupler of the formula:

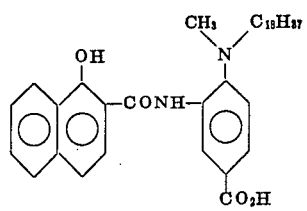

The processing sequence was:

Colour development: 6 minutes
- Sodium borate — 53.3 g.
- Sodium hydroxide — 2.0 g.
- Sodium sulphite anhydrous — 3.9 g.
- Potassium bromide — 0.70 g.
- Hydroxylamine sulphate — 2.34 g.
- Sodium sulphate anhydrous — 7.8 g.
- 4-Amino-N-ethyl-N-(4-hydroxybutyl)-aniline sulphate — 6.0 g.
- Water pH 10.5 — to 1 litre Stop-fix: 4 minutes
- Sodium thiosulphate pentahydrate — 171.0 g.
- Sodium acetate anhydrous — 31.4 g.
- Sodium sulphite anhydrous — 4.3 g.
- Acetic acid (glacial) — 35 ml
- Potassium alum — 17.0 g.
- Ammonium chloride — 43.0 g.
- Water pH 4.3 — to 1 litre Wash: 4 minutes Bleach-Fix: 7 minutes
- Disodium tetraborate decahydrate — 12.5 g.
- Boric acid — 22.5 g.
- Sodium hydroxide — 10.0 g.
- Ethylenediaminetetraacetic acid — 16.2 g.
- Disodium salt of ethylenediamine-tetraacetic acid dihydrate — 3.5 g.
- Ferric chloride (60% w/v soln) — 15 ml
- Sodium thiosulphate pentahydrate — 95.0 g.
- Sodium sulphite anhydrous — 4.0 g.
- Magnesium sulphate — 12.5 g.
- Water pH 7.0 — to 1 litre Wash: 4 minutes Conditioner: 4 minutes
- Disodium salt of ethylenediamine-tetraacetic acid dihydrate — 0.50 g.
- Sodium carbonate anhydrous — 4.5 g.
- Formaldehyde (40% w/v soln) — 10 ml
- Lissapol N (8 percent soln) — 1.7 ml
- Water ph 10.7 — to 1 litre Wash: 4 minutes After processing two samples were analysed and were found to contain 9.10 and 9.32 mg of metallic silver per square decimeter. These results were used as a control for a series of tests wherein samples of the same negative material were fogged and processed as above except that in one series bis (5-methyl-1,2,4-triazol-3yl) diselenide was added to the stop-fix bath and in the other series this compound was added to the bleach-fix bath.

The effect of the addition of these bleach-fix accelerators to the bleach-fix bath and to the stop-fix bath is shown in Table I below wherein the amount of residual metallic silver in the negative material after processing is given.

TABLE 1

| Bath to which the accelerator was added | Conc of accelerator (mg/litre) | Residual Silver after 7' bleach/fixing (mg/dm²) |
|---|---|---|
| Control | — | 9.15 |
| Control | — | 9.32 |
| Bleach/fix | 100 mg/litre | 0.79 |
| Bleach/fix | 100 mg/litre | 0.98 |
| Stop/fix | 100 mg/litre | 2.94 |
| Stop/fix | 100 mg/litre | 2.82 |

A great reduction in the amount of residual silver in the samples which were processed in a bleach-fix bath which comprises the bleach-fix accelerator is thus shown. There is shown also the great reduction in the amount of residual silver in the samples which had been bleach-fixed in the presence of the bleach-fix accelerator, absorbed in the film material derived from the stop-fix bath to which they had been added.

EXAMPLE 3

A silver dye bleach material was used that contains, on an opaque white cellulose acetate film, a red-sensitive silver bromide emulsion with the cyan dye-stuff of the formula

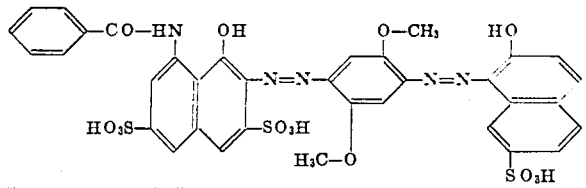

on top of this an empty gelatine separating layer, then a green-sensitive silver bromide emulsion with the magenta dye-stuff of formula

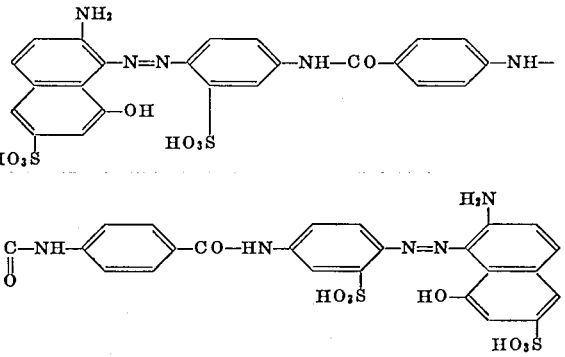

After a further separating layer, there follows a layer with a yellow filter dyestuff or with colloidal silver acting as a yellow filter. On top of this there is a silver bromide layer with the yellow dyestuff of formula

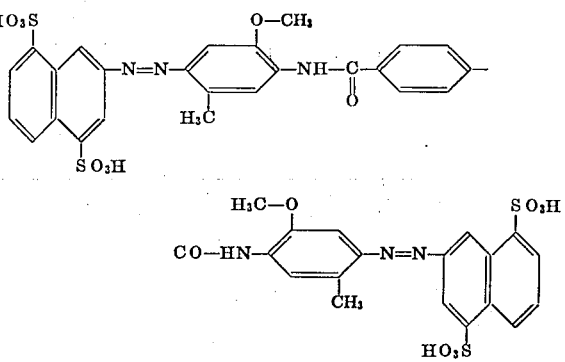

and a covering layer. All layers are hardened with a halogeno-triazine compound such as 2,4-dichloro-6-phenylamino-1,3,5-triazine-3'-sulphonic acid.

The so-composed material was given a neutral wedge exposure and processed, the processing sequence being as follows:

Development: 10 minutes
- p-Methyl-aminophenol-sulphate — 1 g.
- Sodium sulphite anhydrous — 20 g.
- Hydroquinone — 4 g.
- Sodium carbonate anhydrous — 10 g.
- Potassium bromide — 2 g.
- Water — to 1 litre Stopfix: 4 minutes
| | |
|---|---|
| Sodium thiosulphate pentahydrate | 200 g. |
| Sodium sulphite anhydrous | 20 g. |
| Water | to 1 litre |

Wash: 8 minutes
Dye-bleach: 20 minutes
| | |
|---|---|
| Sulphuric acid, 96% | 27.5 ml. |
| Potassium iodide | 10 g. |
| Solution of 0.3 g 2,3-dimethyl-6-aminoquinoxaline in 50 ethanol | 15 ml. |
| Water | to 1 litre |

Wash: 4 minutes
Bleach-fix: 6 minutes
| | |
|---|---|
| Disodium tetraborate decahydrate | 12.5 g. |
| Boric acid | 22.5 g. |
| Sodium hydroxide | 10.0 g. |
| Ethylenediaminetetraacetic acid | 16.2 g. |
| Disodium salt of ethylenediaminetetraacetic acid dihydrate | 3.5 g. |
| Ferric chloride (60% w/v soln) | 15 ml. |
| Sodium thiosulphate pentahydrate | 95.0 g. |
| Sodium sulphite anhydrous | 4.0 g. |
| Bis(5-methyl-1,2,4-triazol-3-yl)diselenide | 100 mg. |
| Water | to 1 litre |

Wash: 8 minutes
Dry

The processed material was satisfactory and substantially no residual silver was left in the material even in the areas of high exposure. Similar silver-dye-bleach material was exposed and processed using the same solutions as set forth above except that the bleach-fix solution contained no diselenide. Even when the material had been treated in the bleach-fix bath for 25 minutes it was unsatisfactory because it had a high minimal density due to the incomplete removal of the residual silver in the areas of high exposure.

EXAMPLE 4

Preparation of bis (5-methyl-1,2,4-triazol-3-yl)-diselenide.

A solution of 16.2 g. 5-methyl-1,2,4-triazole-3-selenol in 140 ml. water containing 4 g. sodium hydroxide was treated at room temperature with a solution of 12.7 g. iodine in 50 ml. water containing 17 g potassium iodine. The precipitate which formed immediately was collected by filtration and recrystallised from ethanol to give about 8 g. of orange crystals. The I.R. spectrum of the procudt was identical to that of the product obtained in Example 1.

EXAMPLE 5

Preparation of bis (5-hydroxy-1,2,4-triazol-3-yl) diselenide.

A solution of 12 g. 1-ethoxycarbonylselenosemicarbazide in 36 ml. of 10 percent w/v aqueous sodium hydroxide solution was heated on a steam bath for 1½ hours. After cooling, the solution was acidified to about pH = 1 and filtered. The filtrate was then adjusted to pH 7 to 8 and treated with a solution of 7 g. iodide dissolved in 50 ml. water containing 12 g. potassium iodide, and the resulting solid was collected by filtration, washed with ethanol and dried. 7.9 g. of a yellow powder m.pt. 294°–296°C was obtained, the I.R. spectrum of which was almost identical to that of a well characterised sample of bis (5-hydroxy-1,2,4-triazol-3-yl) disulphide.

EXAMPLE 6

Preparation of bis (1,2,4-triazol-3-yl) diselenide.

A solution of 7.4 g. 1,2,4-triazole-3-selenol in 40 ml. water containing 2 g. sodium hydroxide was treated at room temperature with a solution of 6.3 g. iodine dissolved in 25 ml. water containing 8.5 g. potassium iodide. The precipitate which formed immediately was collected by filtration and recrystallised from 250 ml. glacial acetic acid to give 4 g. yellow powder m.pt 210°C.

EXAMPLE 7

The compounds of Examples 4–6 were tested as in Example 2 using the same colour negative tripack material and using the same processing conditions and baths.

The following results were obtained as set forth in Table 2.

TABLE II

| Accelerator | Conc of accelerator in bleach/fix bath (mg/litre) | Residual silver after 6 bleach/ fixing (mg/dm²) |
|---|---|---|
| Control | — | 10 |
| Compound of Example 4 | 100 mg/litre | 2.1 |
| Compound of Example 5 | 100 mg/litre | 2.1 |
| Compound of Example 6 | 100 mg/litre | 1.4 |

EXAMPLE 9

Preparation of bis (2,5-dimethyl-1,2,4-triazol-3-yl) diselenide.

A solution of 1.5 g 2,5-dimethyl-1,2,4-triazole-3-selenol in 100 ml warm toluene was treated with a solution of 0.75 g iodine in 50 ml warm toluene and the mixture stirred. The resulting yellow precipitate was collected by filtration and dried. Yield 0.8 m.pt. 142° C.

I claim:

1. In the processing of a silver halide color photographic material comprising exposed and developed silver halide emulsion layers to yield a material having color dye images therein, the step of treating the exposed and developed photographic material with a stable bleach-fix bath which comprises an aqueous solution of a mild oxidizing agent selected from the group consisting of a ferric chelate complex, a cupric complex or a cobalt (III) complex, a silver halide solvent which is either a water-soluble thiosulphate or a water-soluble thiocyanate and a bleach-fix accelerator in an amount greater than 1 mg per liter of the bleach-fix bath of the formula:

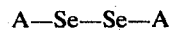

A—Se—Se—A wherein each A represents a 1,2,4-triazolyl radical, bound in its 3-position to the diselenide chain, and bound in its 5-position to a hydrogen atom, an alkyl group, an aralkyl group, or a hydroxy group and one nitrogen atom only of each A radical being bound to a hydrogen atom or to an alkyl group.

2. A process according to claim 1 which comprises employing a bleach-fix accelerator of the formula:

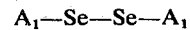

A₁—Se—Se—A₁ wherein each $A_1$ represents a 1,2,4-triazolyl radical bound in its 3-position to the diselenide chain, and bound in its 5-position to a hydrogen atom, a methyl group or a hydroxy group and one nitrogen atom only of each $A_1$ radical being bound to a hydrogen atom.

3. A process according to claim 1 wherein the bleach-fix accelerator is bis (5-methyl-1,2,4-triazol-3yl) diselenide.

4. A process according to claim 1 wherein the bleach-fix accelerator is bis (5-hydroxy-1,2,4-triazol-3yl) diselenide.

5. A process according to claim 1 wherein the bleach-fix accelerator is bis-(1,2,4-triazol-3yl) diselenide.

6. A process according to claim 1 which comprises employing ferric ethylenediaminetetraacetic acid as the mild oxidizing agent.

7. A stable bleach-fix bath which comprises an aqueous solution of a mild oxidizing agent, selected from the group consisting of a ferric chelate complex, a cupric complex or a cobalt (III) complex water-soluble, a water-soluble thiosulphate and a bleach-fix accelerator in an amount greater than 1 mg. per liter of the formula:

A—Se—Se—A wherein each A represents a 1,2,4-triazolyl radical bound in its 3-position to the diselenide chain, and bound in it 5-position to a hydrogen atom, an alkyl group, an aralkyl group or a hydroxy group and one nitrogen atom only of each A radical being bound to a hydrogen atom or to an alkyl group.

8. A stable bleach-fix bath according to claim 7, wherein the bleach-fix accelerator is bis (5-methyl-1,2,4-triazol-3yl) diselenide.

9. A stable bleach-fix bath according to claim 7, wherein the bleach-fix accelerator is bis (5-hydroxy-1,2,4-triazol-3yl) diselenide.

10. A stable bleach-fix bath according to claim 7, wherein the bleach-fix accelerator is bis-(1,2,4-triazol-3yl) diselenide.

* * * * *